US010814927B2

(12) United States Patent
Hsu et al.

(10) Patent No.: US 10,814,927 B2
(45) Date of Patent: Oct. 27, 2020

(54) BICYCLE SADDLE ASSEMBLY STRUCTURE THEREOF

(71) Applicant: GIANT MANUFACTURING CO., LTD., Taichung (TW)

(72) Inventors: Wei-Tsung Hsu, Taichung (TW); Che-Wei Hsu, New Taipei (TW); Wei-Han Tseng, Hsinchu (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 16/249,914

(22) Filed: Jan. 17, 2019

(65) Prior Publication Data

US 2019/0217910 A1 Jul. 18, 2019

(30) Foreign Application Priority Data

Jan. 18, 2018 (TW) .............................. 107101912 A

(51) Int. Cl.
*B62J 1/08* (2006.01)
*B62J 1/00* (2006.01)

(52) U.S. Cl.
CPC ................. *B62J 1/08* (2013.01); *B62J 1/002* (2013.01); *B62J 1/005* (2013.01)

(58) Field of Classification Search
CPC .............. B62J 1/08; B62J 1/002; B62J 1/005
USPC .............................................. 297/202, 195.1
See application file for complete search history.

(56) References Cited

U.S. PATENT DOCUMENTS

| 1,391,409 | A | | 9/1921 | Roberts | |
|---|---|---|---|---|---|
| 5,524,961 | A | * | 6/1996 | Howard | B62J 1/26 297/199 |
| 6,666,507 | B1 | * | 12/2003 | Ringgard | B62J 1/00 297/195.1 |
| 2004/0004374 | A1 | | 1/2004 | Garland et al. | |
| 2010/0244508 | A1 | * | 9/2010 | Segato | B62J 1/00 297/195.1 |
| 2015/0259018 | A1 | * | 9/2015 | Kuipers | B62J 1/02 297/195.1 |

(Continued)

FOREIGN PATENT DOCUMENTS

| CN | 2474436 Y | 1/2002 |
|---|---|---|
| CN | 101674972 A | 3/2010 |
| CN | 101321659 B | 9/2010 |

(Continued)

*Primary Examiner* — Milton Nelson, Jr.
(74) *Attorney, Agent, or Firm* — CKC & Partners Co., LLC

(57) ABSTRACT

A bicycle saddle rail includes a first connecting structure, two arc rods and a second connecting structure. The first connecting structure includes a main body and two first connecting portions. Each of the arc rods has a first end and a second end, and each of the first ends of the two arc rods is integrally connected to one of the first connecting portions of the first connecting structure. The second connecting structure includes two second connecting portions, wherein each of the second connecting portions is integrally connected to one of the second ends of the two arc rods, respectively, and the second connecting structure is connected with the first connecting structure via the two arc rods, so that the first connecting structure, the two arc rods and the second connecting structure are connected to each other and formed the bicycle saddle rail with a closed structure.

7 Claims, 7 Drawing Sheets

(56) References Cited

U.S. PATENT DOCUMENTS

2017/0274950 A1    9/2017  Holt et al.

FOREIGN PATENT DOCUMENTS

| | | |
|---|---|---|
| CN | 202716968 U | 2/2013 |
| CN | 203172766 U | 9/2013 |
| CN | 204223040 U | 3/2015 |
| JP | 2004322945 A | 11/2004 |
| JP | 3113231 U | 9/2005 |
| JP | 2009517286 A | 4/2009 |
| JP | 2015164833 A | 9/2015 |
| TW | M452112 U | 5/2013 |
| WO | 2007063526 A1 | 6/2007 |
| WO | 201207520 A1 | 8/2012 |
| WO | 2017178969 A1 | 10/2017 |

* cited by examiner

BICYCLE SADDLE ASSEMBLY STRUCTURE THEREOF

RELATED APPLICATIONS

This application claims priority to Taiwan Application Serial Number 107101912, filed Jan. 18, 2018, which is herein incorporated by reference.

BACKGROUND

Technical Field

The present disclosure relates to a bicycle saddle rail and a bicycle saddle assembly structure thereof. More particularly, the present disclosure relates to a bicycle saddle rail and a bicycle saddle assembly structure thereof which are integrally formed and totally enclosed.

Description of Related Art

A conventional bicycle saddle generally includes a saddle body and a bicycle saddle rail, wherein the saddle body is used for the user to seat, and the bicycle saddle rail is for supporting the saddle body and is connected to a seat post of a bicycle. The conventional bicycle saddle rail is made of a metal rod by bending integrally and includes two parallel supporting sections, and two ends and a turning section of the bicycle saddle rail are inserted and glued to the saddle body so as to fix the bicycle saddle rail on the saddle body. The aforementioned bicycle saddle rail is easy to manufacture and assemble so that it is widely applied in the field of bicycle saddles.

However, the overall structural strength of the bicycle saddle rail made of the metal rod by bending is not sufficient enough, and thereby the connecting stability between the saddle body and the bicycle saddle rail will be affected. Furthermore, because the connection between the saddle body and the bicycle saddle rail is fixed by a three-point connection method, the supporting ability of the bicycle saddle rail will be limited. The connecting structures disposed on two ends of the bicycle saddle rail respectively will be worn by the weight of the user as well as the vibration impact generated from the bicycle including the aforementioned bicycle saddle rail traveling on bumpy roads so as to damage the connection between the bicycle saddle rail and the saddle body. Moreover, the bicycle saddle may be broken along with the deformation and damage of the bicycle saddle rail.

Furthermore, along with the increasing demands for light-weight of bicycles, weight-reducing of bicycle saddles also become one of the development goals of the people in the related field. In the field of light-weight bicycle saddles, the size and the weight of the bicycle saddle rail made of the metal rod by bending are further reduced, which has a great influence on the structural strength and the supporting ability of the bicycle saddle rails.

Therefore, to people having ordinary skills in the art, there is a need to develop a bicycle saddle rail and a bicycle saddle assembly structure with high structural strength and high supporting ability.

SUMMARY

According to one aspect of the present disclosure, a bicycle saddle rail includes a first connecting structure, two arc rods and a second connecting structure. The first connecting structure includes a main body and two first connecting portions, wherein the two first connecting portions are disposed on two sides of the main body, respectively. The two arc rods are disposed side by side, wherein each of the arc rods has a first end and a second end, and each of the first ends of the two arc rods is integrally connected to one of the first connecting portions of the first connecting structure. The second connecting structure includes two second connecting portions, wherein each of the second connecting portions is integrally connected to one of the second ends of the two arc rods, respectively, and the second connecting structure is connected with the first connecting structure via the two arc rods, so that the first connecting structure, the two arc rods and the second connecting structure are connected to each other and formed the bicycle saddle rail with a closed structure.

According to another aspect of the present disclosure, a bicycle saddle assembly structure includes a bicycle saddle rail and a base. The bicycle saddle rail includes a first connecting structure, two arc rods and a second connecting structure. The first connecting structure includes a main body and two first connecting portions, wherein the two first connecting portions are disposed on two sides of the main body, respectively. The two arc rods are disposed side by side, wherein each of the arc rods has a first end and a second end, and each of the first ends of the two arc rods is integrally connected to one of the first connecting portions of the first connecting structure. The second connecting structure includes two second connecting portions, wherein each of the second connecting portions is integrally connected to one of the second ends of the two arc rods, respectively, and the second connecting structure is connected with the first connecting structure via the two arc rods, so that the first connecting structure, the two arc rods and the second connecting structure are connected to each other and formed the bicycle saddle rail with a closed structure. The base is disposed on the bicycle saddle rail and has a wide edge portion and a narrow edge portion, and the base includes a first binding structure and a second binding structure. The first binding structure is integrally disposed on the wide edge portion and correspondingly connected to the first connecting structure of the bicycle saddle rail. The second binding structure is integrally disposed on the narrow edge portion and correspondingly connected to the second connecting structure of the bicycle saddle rail.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
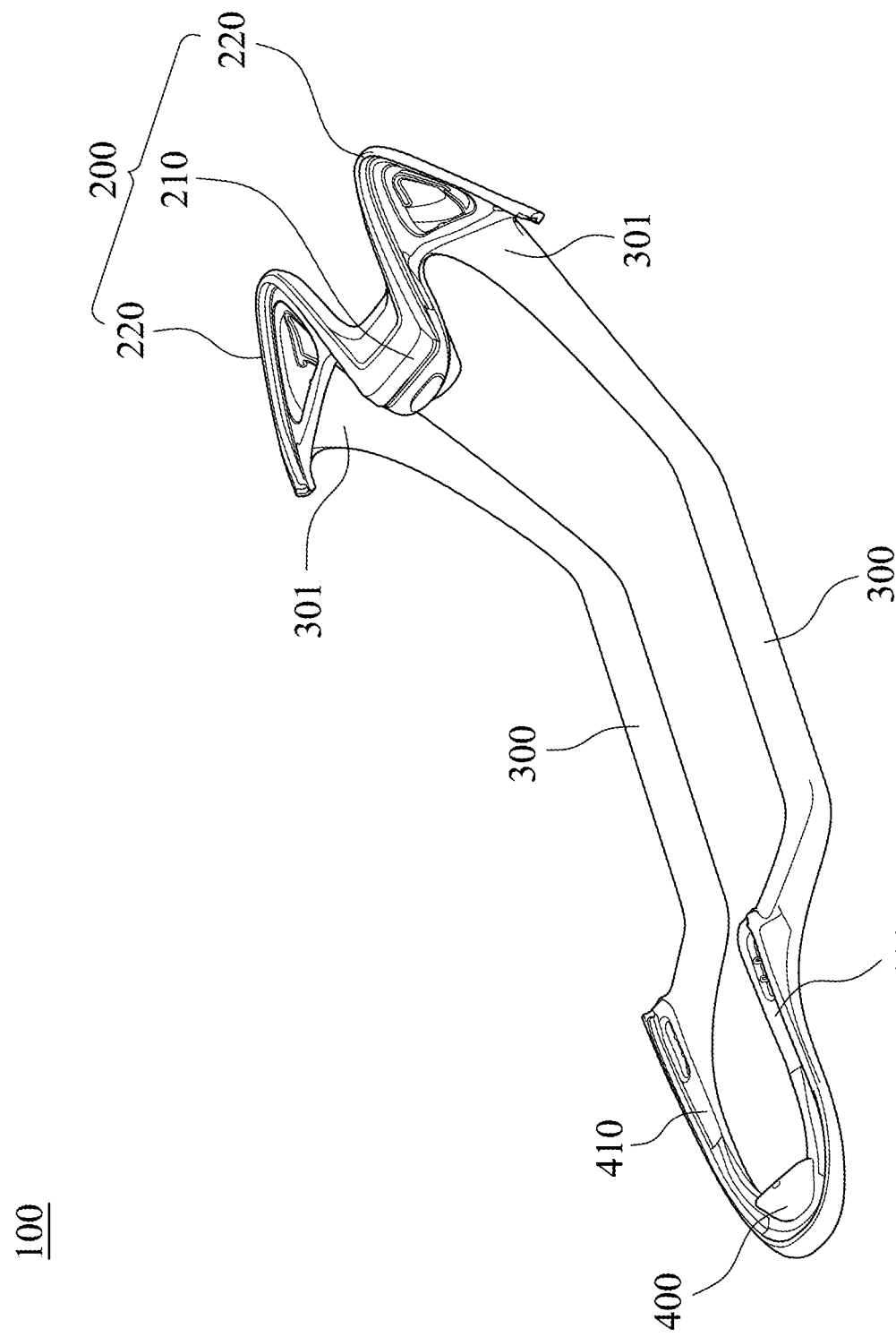
FIG. 1 is a three-dimensional schematic view of a bicycle saddle rail according to one embodiment of the present disclosure.
Figure 2:
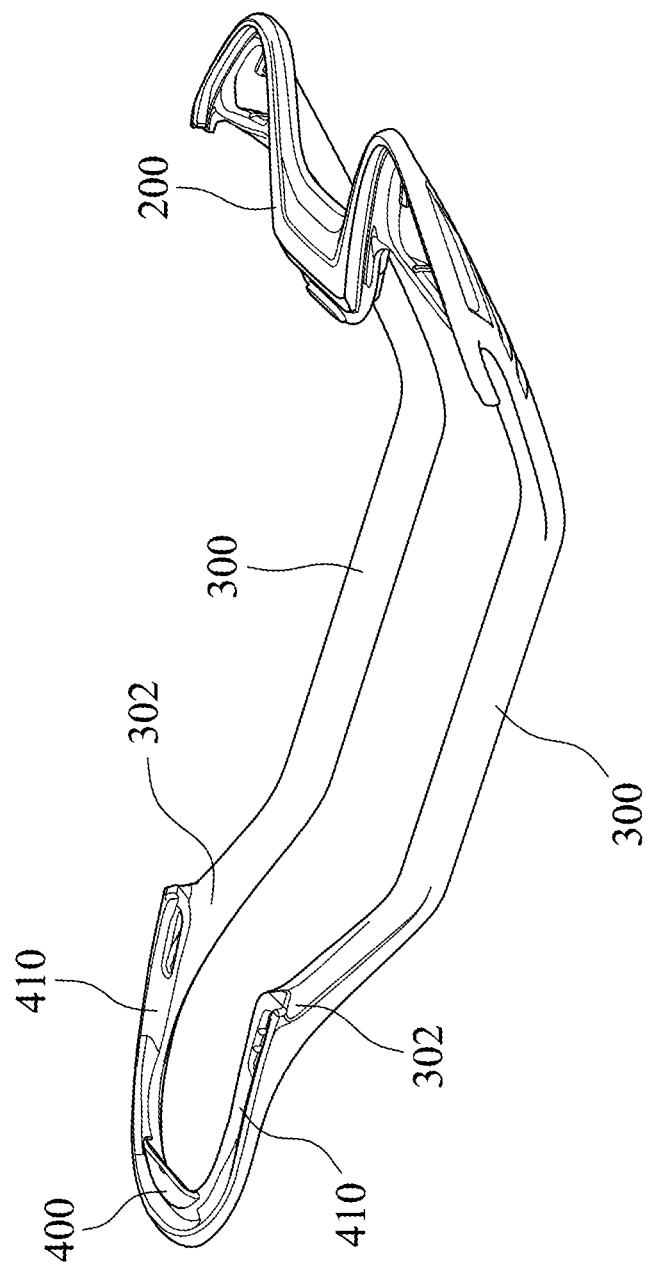
FIG. 2 is another three-dimensional schematic view of the bicycle saddle rail of FIG. 1.

FIG. 1 is a three-dimensional schematic view of a bicycle saddle rail 100 according to one embodiment of the present disclosure. FIG. 2 is another three-dimensional schematic view of the bicycle saddle rail 100 of FIG. 1. The bicycle saddle rail 100 includes a first connecting structure 200, two arc rods 300 and a second connecting structure 400.

The first connecting structure 200 includes a main body 210 and two first connecting portions 220, wherein the two first connecting portions 220 are disposed on two sides of the main body 210, respectively. The two arc rods 300 are disposed side by side, wherein each of the arc rods 300 has a first end 301 and a second end 302, and each of the first ends 301 of the two arc rods 300 is integrally connected to one of the first connecting portions 220 of the first connecting structure 200. The second connecting structure 400 includes two second connecting portions 410, wherein each of the second connecting portions 410 is integrally connected to one of the second ends 302 of the two arc rods 300, respectively, and the second connecting structure 400 is connected with the first connecting structure 200 via the two arc rods 300, so that the first connecting structure 200, the two arc rods 300 and the second connecting structure 400 are connected to each other and formed the bicycle saddle rail 100 with a closed structure. In the embodiment of FIG. 1, the bicycle saddle rail 100 is generally formed as a closed ring structure. Therefore, the overall structural strength of the bicycle saddle rail 100 which is integrally formed and totally enclosed as a closed ring structure can be increased—for avoiding the damages to the bicycle saddle rail 100 caused by the weight of the user as well as the toward, backward, upward and downward vibration impact generated from the bicycle traveling on bumpy roads. Accordingly, the occurrence of deformation and breaking of the bicycle saddle rail 100 can be reduce, and the riding safety can be improved.

As shown in FIG. 1, the two first connecting portions 220 of the first connecting structure 200 are connected with the main body 210 and extended from the two sides of the main body 210, respectively, so that the first connecting structure 200 is generally formed as a planar M-shaped structure. A shape of the second connecting structure 400 is bent as semicircular rod-shaped, the two second connecting portions 410 are parallel to each other, and the two second connecting portions 410 are disposed on two ends of the second connecting structure 400 being semicircular rod-shaped. Therefore, the contact area between the bicycle saddle rail 100 and a bicycle base (not shown) can be increased when the bicycle saddle rail 100 is connected to the bicycle base subsequently, and the supporting effect of the bicycle saddle rail 100 to the bicycle base can be enhanced so as to prevent the weight of user from being concentratedly applied on the first ends 301 and the second ends of the two arc rods 300, so that the service life of the bicycle saddle rail 100 can be further extended. Furthermore, in the embodiment of FIG. 1, a material of the first connecting structure 200, the two arc rods 300 and the second connecting structure 400 can be a carbon fiber, so that the demand for light-weighting of the bicycle saddle rail 100 can be achieved.

It must be noted that the shapes of the first connecting structure 200 and the second connecting structure 400 can be arranged according to actual needs, the bending angle and size of the two arc rods 300 also can be arranged according to actual needs, the materials of the first connecting structure 200, the two arc rods 300 and the second connecting structure 400 can be replaced with other lighter materials, and the present disclosure is not limited thereto.

Figure 3:
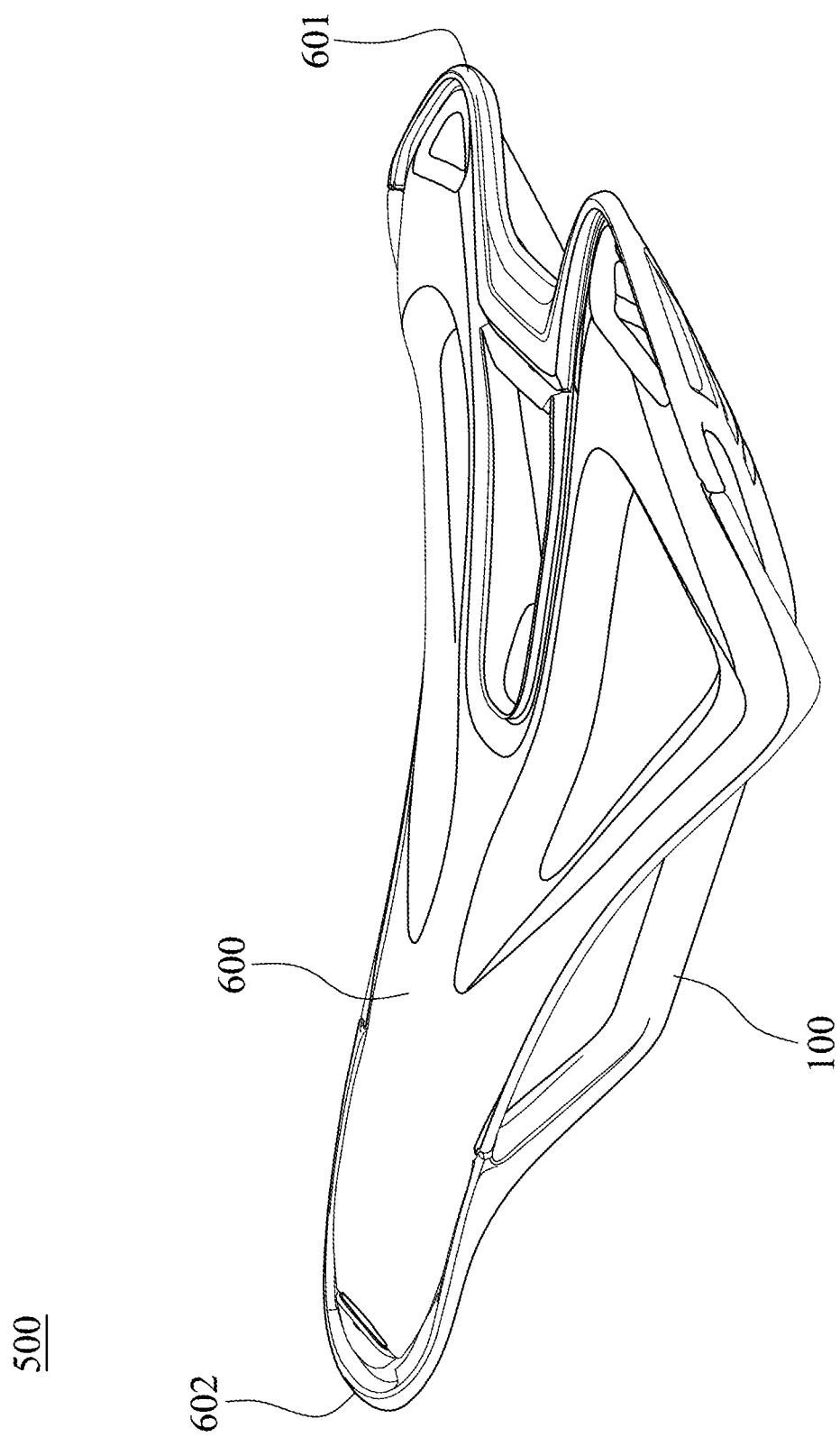
FIG. 3 is a three-dimensional schematic view of a bicycle saddle assembly structure according to another embodiment of the present disclosure.
Figure 4:
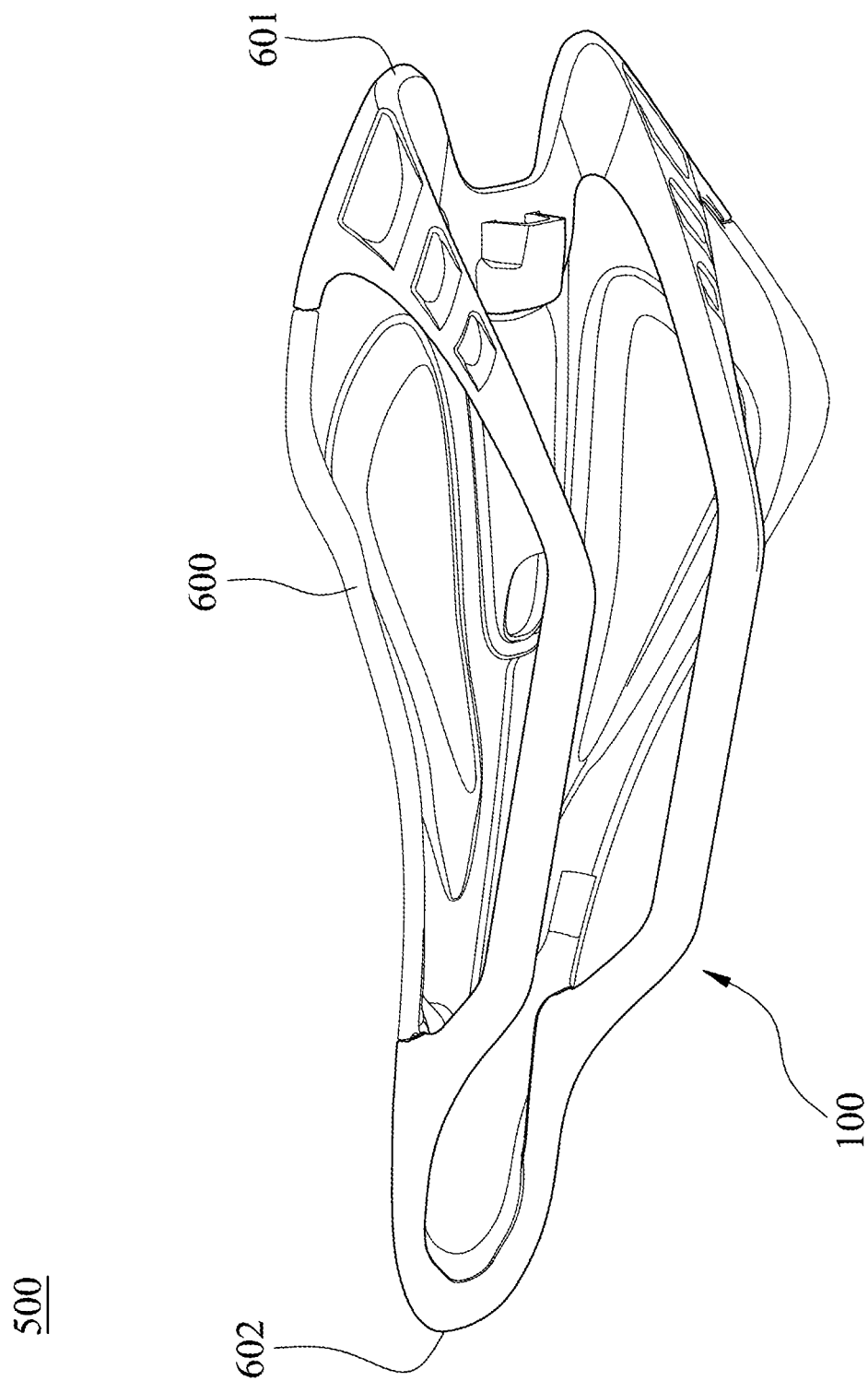
FIG. 4 is another three-dimensional schematic view of the bicycle saddle assembly structure of FIG. 3.
Figure 5:
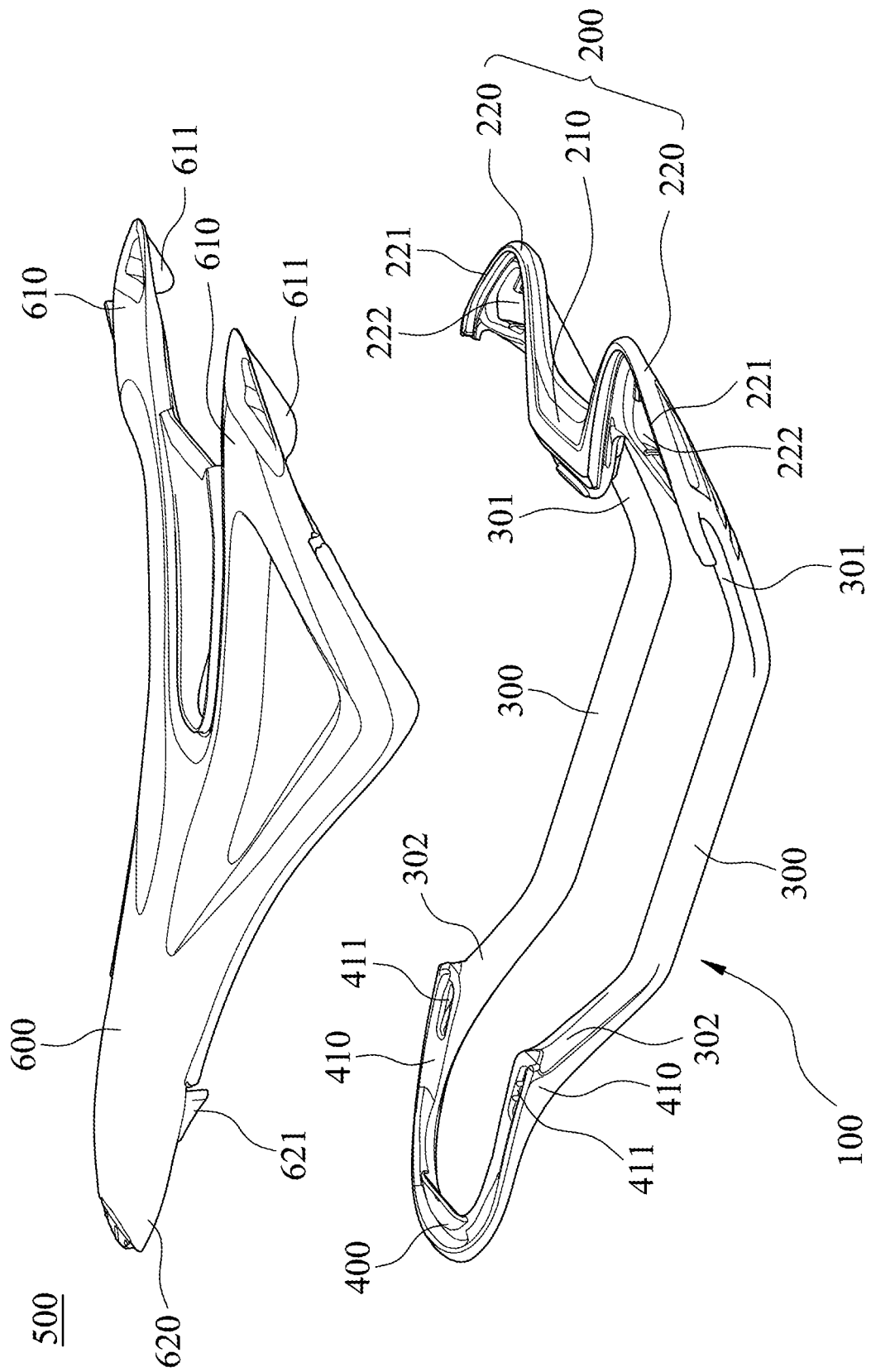
FIG. 5 is an exploded view of the bicycle saddle assembly structure of FIG. 3.

FIG. 3 is a three-dimensional schematic view of a bicycle saddle assembly structure 500 according to another embodiment of the present disclosure. FIG. 4 is another three-dimensional schematic view of the bicycle saddle assembly structure 500 of FIG. 3. FIG. 5 is an exploded view of the bicycle saddle assembly structure 500 of FIG. 3. The bicycle saddle assembly structure 500 includes a bicycle saddle rail 100 and a base 600.

The bicycle saddle rail 100 includes a first connecting structure 200, two arc rods 300 and a second connecting structure 400. The first connecting structure 200 includes a main body 210 and two first connecting portions 220, wherein the two first connecting portions 220 are disposed on two sides of the main body 210, respectively. The two arc rods 300 are disposed parallel to each other, wherein each of the arc rods 300 has a first end 301 and a second end 302, and each of the first ends 301 of the two arc rods 300 is integrally connected to one of the first connecting portions 220 of the first connecting structure 200. The second connecting structure 400 includes two second connecting portions 410, wherein each of the second connecting portions 410 is integrally connected to one of the second ends 302 of the two arc rods 300, respectively, and the second connecting structure 400 is connected with the first connecting structure 200 via the two arc rods 300, so that the first connecting structure 200, the two arc rods 300 and the second connecting structure 400 are connected to each other and formed the bicycle saddle rail 100 with a closed structure. Preferably, in the embodiment of FIG. 3, the bicycle saddle rail 100 is generally formed as a closed ring structure. Therefore, the overall structural strength of the bicycle saddle rail 100 which is integrally formed and totally enclosed as a closed ring structure can be increased for avoiding the damages to the bicycle saddle rail 100 caused by the weight of the user as well as the toward, backward, upward and downward vibration impact generated from the bicycle traveling on bumpy roads. Accordingly, the occurrence of deformation and breaking of the bicycle saddle rail 100 can be reduce, and the riding safety can be also improved.

The base 600 is disposed on the bicycle saddle rail 100 and has a wide edge portion 601 and a narrow edge portion 602, and the base 600 includes a first binding structure 610 and a second binding structure 620. The first binding structure 610 is integrally disposed on the wide edge portion 601 and correspondingly connected to the first connecting structure 200 of the bicycle saddle rail 100. The second binding structure 620 is integrally disposed on the narrow edge portion 602 and correspondingly connected to the second connecting structure 400 of the bicycle saddle rail 100. After the correspondingly connecting of the first binding structure 610 and the first connecting structure 200, and the correspondingly connecting of the second binding structure 620 and the second connecting structure 400, the connection strength between the base 600 and the bicycle saddle rail 100 can be further enhanced by applying a glue, an adhesive, or using a lock attachment method, and the present disclosure is not limited thereto.

As shown in FIG. 3 and FIG. 4, the bicycle saddle assembly structure 500 has an integrally fully-enclosed structure by a close-fitting connection between the bicycle saddle rail 100 and the base 600, and the appearance of the connection between the base 600 and each of the two arc rods 200 of the bicycle saddle rail 100 (reference number is shown in FIG. 5) is a closed ring connection, and it is favorable for not only increasing the overall structural strength of the bicycle saddle assembly structure 500 but also providing an integral visual feeling to the bicycle saddle assembly structure 500. Furthermore, because the first binding structure 610 is integrally disposed on the wide edge portion 601 of the base 600, when the first binding structure 610 is connected to the first connecting structure 200, a connecting portion thereof is located on a rear part of the bicycle saddle assembly structure 500 (that is, a part close to the rear edge of the hip of the user which is in a sitting posture, so that the use comfort of the bicycle saddle assembly structure 500 can be further increased.

As shown in FIG. 5, the two first connecting portions 220 of the first connecting structure 200 of the bicycle saddle rail 100 are connected with the main body 210 and extended from the two side of the main body 210, respectively, so that the first connecting structure 200 is generally formed as a planar M-shaped structure. The first connecting structure 200 has a mounting face 221 facing to the base 600, each of the first ends 301 of the two of the arc rods 300 is integrally connected to a face which is different from the mounting face 221 of the first connecting structure 200. A shape of the second connecting structure 400 is bent as semicircular rod-shaped, the two second connecting portions 410 are disposed on two ends of the second connecting structure 400 being semicircular rod-shaped, and the two second connecting portions 410 are parallel to each other. Therefore, the contact area between the bicycle saddle rail 100 and the base 600 can be increased when the bicycle saddle rail 100 is connected to the base 600 subsequently, and the supporting effect of the bicycle saddle rail 100 to the base 600 can be enhanced so as to prevent the weight of user from being concentratedly, and the service life of the bicycle saddle rail 100 can be further extended.

In the embodiment of FIG. 5, the first connecting structure 200 of the bicycle saddle rail 100 can include at least one first connecting element 222. More preferably, the first connecting structure 200 includes two of the first connecting elements 222, and the two first connecting elements 222 are disposed on the mounting faces 221 of each of the first connecting portions 220 of the first connecting structure 200. The first binding structure 610 of the base 600 can include at least one first binding element 611. More preferably, the first binding structure 610 includes two of the first binding elements 611, and the two first connecting elements 222 are correspondingly connected to each of the two first binding elements 611, respectively. Furthermore, in the embodiment of FIG. 5, the second connecting structure 400 of the bicycle saddle rail 100 can include at least one second connecting element 411. More preferably, the second connecting structure 400 includes two of the second connecting elements 411, and the two second connecting elements 411 are disposed on each of the second connecting portions 410 of the second connecting structure 400. The second binding structure 620 of the base 600 can include at least one second binding element 621. More preferably, the second binding structure 620 includes two of the second binding elements 621, and two the second connecting elements 411 are correspondingly connected to each of the two second binding elements 621, respectively. Therefore, the connection strength between the bicycle saddle rail 100 and the base 600 can be enhanced by the disposition of the first connecting elements 222 connected to each of the first binding elements 611 as well as the second connecting elements 411 connected to each of the second binding element 621, respectively, so that it is favorable for improving the overall structural strength and the supporting effect of the bicycle saddle assembly structure 500, and the load limitation of the bicycle saddle assembly structure 500 can be further increased.

Moreover, in the embodiment of FIG. 3, a material of the first connecting structure 200, the two arc rods 300 and the second connecting structure 400 can be a carbon fiber, and a material of the base 600 can also be a carbon fiber, so that the demand for lightweight of the bicycle saddle assembly structure 500 can be achieved.

Figure 6:
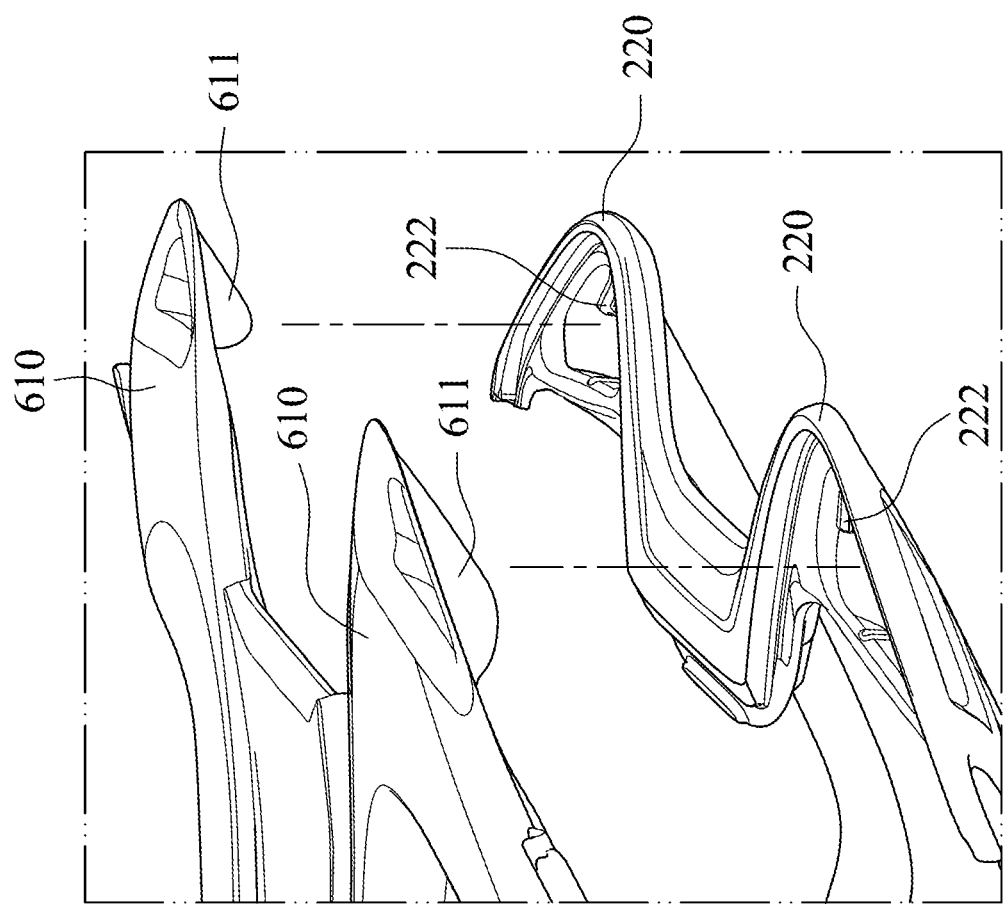
FIG. 6 is a connecting schematic view of a first connecting structure of the bicycle saddle rail and a first binding structure of the base according to the bicycle saddle assembly structure of FIG. 3.

FIG. 6 is a connecting schematic view of the first connecting structure 200 of the bicycle saddle rail 100 and the first binding structure 610 of the base 600 according to the bicycle saddle assembly structure 500 of FIG. 3. The first connecting structure 200 is connected to the two first binding elements 611 of the first binding structure 610 via the two first connecting elements 222. In the embodiment of FIG. 6, each of the two first connecting elements 222 is an engaging base, each of the two first binding elements 611 is an engaging block corresponding to the first connecting elements 222, and the engaging block is detachably connected with the engaging base. Therefore, the base 600 and the bicycle saddle rail 100 can be closely integrated to each other by the paired setting of the first connecting elements 222 and first binding elements 611, and the arrangement of the first connecting structure 200 and the first binding structure 610 can promote the weight applied by the user from the top to the bottom to the bicycle saddle assembly structure 500 being evenly distributed around the entire structure of the base 600 instead of the first connecting elements 222 and the first binding elements 611. Furthermore, the connection between the bicycle saddle rail 100 and the base 600 can be prevented from loosening by a top-down force applied to bicycle saddle assembly structure 500 generated from the user so as to increase the loading capacity and the service life of the bicycle saddle assembly structure 500.

Figure 7:
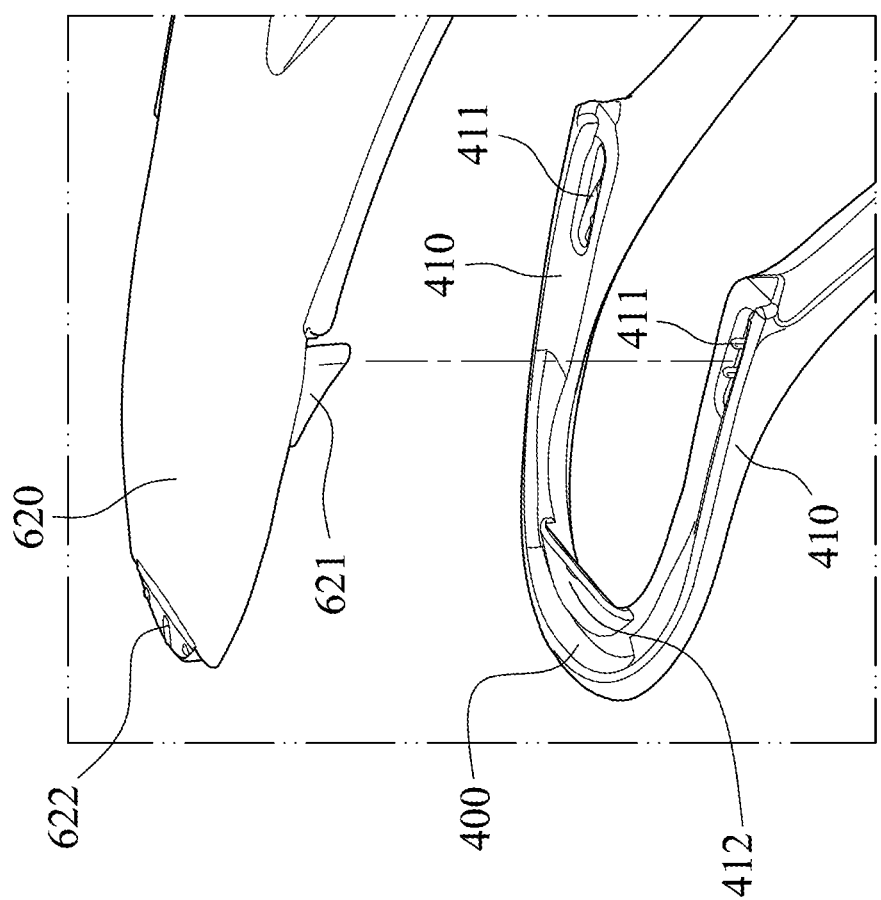
FIG. 7 is a connecting schematic view of a second connecting structure of the bicycle saddle rail and a second binding structure of the base according to the bicycle saddle assembly structure of FIG. 3.

FIG. 7 is a connecting schematic view of the second connecting structure 400 of the bicycle saddle rail 100 and the second binding structure 620 of the base 600 according to the bicycle saddle assembly structure 500 of FIG. 3. The second connecting structure 400 is connected to the two second binding elements 621 of the second binding structure 620 via the two second connecting elements 411. In the embodiment of FIG. 6, each of the two second connecting elements 411 is an embedding base, each of the second binding elements 621 is an embedding block corresponding to the second connecting element 411, and the embedding block is detachably connected with the embedding base. Therefore, the base 600 and the bicycle saddle rail 100 can be closely integrated to each other by the paired setting of the second connecting elements 411 and the second binding elements 621, and it is favorable for evenly distributing the weight applied by the user to the bicycle saddle assembly structure 500 and keeping the connecting stability in the left and right direction between the bicycle saddle rail 100 and the base 600 when riding the bicycle including the bicycle saddle assembly structure 500.

As shown in FIG. 7, the second connecting structure 400 of the bicycle saddle assembly structure 500 can further include a third connecting element 412, the second binding structure 620 can further include a third binding element 622, and the third connecting element 412 is correspondingly connected to the third binding element 622. In the embodiment of FIG. 7, the third binding element 622 is disposed on the narrow edge portion 602 of the base 600 (reference number is shown in FIG. 4) and set as a block element so as to be correspondingly inserted in the third connecting element 412 being a slot. In detail, in the embodiment of FIG. 7, a level of the third connecting element 412 is higher than a level of each of the second connecting portions 410, and the third connecting element 412 extends along a direction from an inner arc portion (reference number is omitted) of the second connecting structure 400 being semicircular rod-shaped toward the first connecting structure 200. In the assembly process thereof, the third binding element 622 can be correspondingly inserted in the third connecting element 412 first, and then the second connecting elements 411 can be further connected to the second binding elements 621, so that the combination strength of the bicycle saddle assembly structure 500 can be significantly increased. Therefore, the connection between the bicycle saddle rail 100 and the base 600 can be further prevented from loosening by a top-down force applied to bicycle saddle assembly structure 500 generated from the user so as to increase the loading capacity and the service life of the bicycle saddle assembly structure 500.

It must be noted that the shapes of the first connecting structure 200 and the second connecting structure 400 of the bicycle saddle rail 100, and the shapes of the first binding structure 610 and the second binding structure 620 of the base 600 can be arranged according to actual needs, and the bending angle and size of the two arc rods 300 also can be arranged according to actual needs. The numbers of the first connecting elements 222, the second connecting elements 411, the third connecting elements 412, the first binding elements 611, the second binding elements 621, and the third binding elements 622 and the patterns thereof can be arranged according to actual needs, and the present disclosure is not limited thereto. Furthermore, the materials of the first connecting structure 200, the two arc rods 300, the second connecting structure 400 and the base 600 can also be replaced with other lighter materials, and the present disclosure is not limited thereto.

According to the aforementioned embodiments, the present disclosure has the advantages described bellowing. First, the overall structural strength of the bicycle saddle rail can be increased by forming the bicycle saddle rail with a closed structure via the integrally connection of the first connecting structure, the two arc rods and the second connecting structure for avoiding the damages to the bicycle saddle rail caused by the weight of the user as well as the toward, backward, upward and downward vibration impact generated from the bicycle traveling on bumpy roads. Accordingly, the occurrence of deformation and breaking of the bicycle saddle rail can be reduced, and the riding safety can be improved. Second, by the close-fitting connection between the bicycle saddle rail and the base, the bicycle saddle assembly structure can have an integrally fully-enclosed structure, so that the overall structural strength of the bicycle saddle assembly structure can be increased. Third, by the disposition that the first connecting elements are respectively connected to each of the first binding elements as well as the second connecting element are respectively connected to each of the second binding elements can greatly increase the connection strength between the bicycle saddle rail and the base, so that the overall structural strength and the supporting effect of the bicycle saddle assembly structure can be improved, and the loading capacity and the service life of the bicycle saddle assembly structure can be effectively increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A bicycle saddle assembly structure, comprising:
a bicycle saddle rail, comprising:
a first connecting structure comprising a main body and two first connecting portions, wherein the two first connecting portions are disposed on two sides of the main body, respectively;
two arc rods disposed side by side, wherein each of the arc rods has a first end and a second end, and each of the first ends of the two arc rods is integrally connected to one of the first connecting portions of the first connecting structure; and
a second connecting structure comprising two second connecting portions, wherein each of the second connecting portions is integrally connected to one of the second ends of the two arc rods, respectively, and the second connecting structure is connected with the first connecting structure via the two arc rods, so that the first connecting structure, the two arc rods and the second connecting structure are connected to each other and forms the bicycle saddle rail with a closed structure; and
a base disposed on the bicycle saddle rail and having a wide edge portion and a narrow edge portion, and the base comprising:
a first binding structure integrally disposed on the wide edge portion and correspondingly connected to the first connecting structure of the bicycle saddle rail; and
a second binding structure integrally disposed on the narrow edge portion and correspondingly connected to the second connecting structure of the bicycle saddle rail;
wherein the first connecting structure comprises at least one first connecting element, the first binding structure comprises at least one first binding element, and the first connecting element is correspondingly connected to the first binding element, wherein the first connecting element is an engaging base, the first binding element is an engaging block, and the engaging block is detachably connected with the engaging base;
wherein the second connecting structure comprises at least one second connecting element, the second binding structure comprises at least one second binding element, and the second connecting element is correspondingly connected to the second binding element, wherein the second connecting element is an embedding base, the second binding element is an embedding block, and the embedding block is detachably connected with the embedding base;

wherein the second connecting structure further comprises a third connecting element, the second binding structure further comprises a third binding element, and the third binding element is correspondingly inserted in the third connecting element.

2. The bicycle saddle assembly structure of claim 1, wherein a shape of the second connecting structure is semicircular rod-shaped, a level of the third connecting element is higher than a level of each of the two second connecting portions, and the third connecting element extends along a direction from an inner arc portion of the second connecting structure being semicircular rod-shaped toward the first connecting structure.

3. The bicycle saddle assembly structure of claim 1, wherein a shape of the second connecting structure is semicircular rod-shaped, and the two second connecting portions are disposed on two ends of the second connecting structure, respectively.

4. The bicycle saddle assembly structure of claim 1, wherein the bicycle saddle rail is generally formed as a closed ring structure.

5. The bicycle saddle assembly structure of claim 1, wherein the first connecting structure has a mounting face facing to the base, two of the first connecting elements are disposed on the mounting face, respectively, and each of the first ends of the two arc rods is integrally connected to a face which is different from the mounting face of the first connecting structure.

6. The bicycle saddle assembly structure of claim 1, wherein a material of the first connecting structure, the two arc rods and the second connecting structure is a carbon fiber.

7. The bicycle saddle assembly structure of claim 1, wherein a material of the base is a carbon fiber.

* * * * *